(12) United States Patent
Mueller et al.

(10) Patent No.: US 10,352,245 B2
(45) Date of Patent: Jul. 16, 2019

(54) WINDAGE SHIELD SYSTEM AND METHOD OF SUPPRESSING RESONANT ACOUSTIC NOISE

(71) Applicant: General Electric Company, Schenectady, NY (US)

(72) Inventors: John Herman Mueller, Hamilton, OH (US); Kevin Samuel Klasing, Springboro, OH (US); Andrew B. Gebbia, West Chester, OH (US); Steven Curtiss Warfield, West Chester, OH (US)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 14/875,313

(22) Filed: Oct. 5, 2015

(65) Prior Publication Data

US 2017/0096939 A1    Apr. 6, 2017

(51) Int. Cl.
*F02C 7/18*    (2006.01)
*F01D 25/12*    (2006.01)
(Continued)

(52) U.S. Cl.
CPC .............. *F02C 7/185* (2013.01); *F01D 5/082* (2013.01); *F01D 25/12* (2013.01); *F01D 25/243* (2013.01);
(Continued)

(58) Field of Classification Search
CPC ............. F02C 7/185; F02C 7/24; F01D 6/082
See application file for complete search history.

(56) References Cited

U.S. PATENT DOCUMENTS 4,190,397 A * 2/1980 Schilling ............... F01D 25/243
415/108
4,320,903 A * 3/1982 Ayache ................... F01D 11/02
277/415
(Continued)

FOREIGN PATENT DOCUMENTS

DE         19 41 873 A1    3/1971
DE    10 2013 220455 A1    4/2015
(Continued)

OTHER PUBLICATIONS

Notification of Reasons for Refusal issued in connection with corresponding JP Application No. 2016-189003 dated Nov. 7, 2017.

(Continued)

*Primary Examiner* — Woody A Lee, Jr.
(74) *Attorney, Agent, or Firm* — Dority & Manning, P.A.

(57) ABSTRACT

A windage shield system is provided. The system includes an annular cavity having an inlet end and an outlet end. The annular cavity is configured to direct a flow of cooling fluid from the inlet end to the outlet end. The system also includes a source of a flow of cooling fluid coupled in flow communication with the annular cavity. The annular cavity is bounded by a stationary component and a rotating component, and the rotating component introduces heat into the annular cavity by windage effects. The system also includes a cooling channel coupled in flow communication with the outlet end, and a first windage shield extending from the outlet end towards the inlet end within the annular cavity.

18 Claims, 6 Drawing Sheets

(51) Int. Cl.
*F01D 25/24* (2006.01)
*F02C 7/24* (2006.01)
*F01D 5/08* (2006.01)

(52) U.S. Cl.
CPC ............ *F02C 7/24* (2013.01); *F05D 2260/97* (2013.01); *F05D 2260/972* (2013.01)

(56) References Cited

U.S. PATENT DOCUMENTS

| | | | | |
|---|---|---|---|---|
| 4,657,482 A * | 4/1987 | Neal | ............ | F02C 7/18 415/116 |
| 4,807,433 A | 2/1989 | Maclin et al. | | |
| 5,090,865 A * | 2/1992 | Ramachandran | ....... | F01D 5/066 285/405 |
| 5,218,816 A * | 6/1993 | Plemmons | .............. | F01D 11/02 277/419 |
| 5,332,358 A * | 7/1994 | Hemmelgarn | ........ | F01D 11/001 29/888.02 |
| 5,575,616 A | 11/1996 | Hagle et al. | | |
| 6,065,928 A | 5/2000 | Rieck, Jr. et al. | | |
| 6,540,477 B2 | 4/2003 | Glynn et al. | | |
| 6,761,034 B2 | 7/2004 | Niday et al. | | |
| 6,884,036 B2 | 4/2005 | Shi et al. | | |
| 7,007,488 B2 | 3/2006 | Orlando et al. | | |
| 7,249,463 B2 * | 7/2007 | Anderson | ............. | F01D 25/243 415/112 |
| 7,296,415 B2 * | 11/2007 | Coulon | ................. | F01D 11/025 415/170.1 |
| 8,292,573 B2 | 10/2012 | Broomer et al. | | |
| 8,408,868 B2 | 4/2013 | Hatman | | |
| 8,459,941 B2 | 6/2013 | Jasko et al. | | |
| 8,517,666 B2 | 8/2013 | Alvanos et al. | | |
| 8,529,195 B2 | 9/2013 | Widener | | |
| 9,828,881 B2 * | 11/2017 | Max | ........................ | F01D 25/28 |
| 2007/0089430 A1 | 4/2007 | Klinger | | |
| 2010/0158668 A1 * | 6/2010 | Ottaviano | ................. | F02C 3/08 415/104 |
| 2010/0316484 A1 * | 12/2010 | Jasko | ..................... | F01D 9/041 415/1 |
| 2015/0121897 A1 | 5/2015 | Ress, Jr. | | |

FOREIGN PATENT DOCUMENTS

| | | |
|---|---|---|
| EP | 1172523 A2 | 1/2002 |
| GB | 1 531 037 A | 11/1978 |

OTHER PUBLICATIONS

Extended European Search Report and Opinion issued in connection with corresponding EP Application No. 16191597.0 dated Feb. 27, 2017.

* cited by examiner

WINDAGE SHIELD SYSTEM AND METHOD OF SUPPRESSING RESONANT ACOUSTIC NOISE

BACKGROUND

The field of the disclosure relates generally to turbofan engines and, more particularly, to systems and methods of reducing the temperature of air in the rotor cavity of a turbine assembly.

At least some known gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a second drive shaft. The low-pressure turbine rotatably drives the fan through the second drive shaft.

In at least some known turbofans, a portion of air discharged from the compressor is channeled towards a rotor cavity of the high-pressure turbine and the air is used downstream therefrom for cooling purposes. During operation, many modern commercial turbofans generate heat and noise between the surfaces of rotating members of the turbofan and the air surrounding the rotating members. More specifically, the heat generated by the rotating members of the turbofan increases the temperature of the compressor discharge air channeled through the rotor cavity. As such, the cooling efficiency of the compressor discharge air is reduced.

BRIEF DESCRIPTION

In one aspect, a windage shield system is provided. The system includes an annular cavity having an inlet end and an outlet end. The annular cavity is configured to direct a flow of cooling fluid from the inlet end to the outlet end. The system also includes a source of a flow of cooling fluid coupled in flow communication with the annular cavity. The annular cavity is bounded by a stationary component and a rotating component, and the rotating component introduces heat into the annular cavity by windage effects. The system also includes a cooling channel coupled in flow communication with the outlet end, and a first windage shield extending from the outlet end towards the inlet end within the annular cavity. The first windage shield divides the annular cavity into at least two flow paths, such as a first flow path defined between the rotating component and the first windage shield, and a second flow path defined between the stationary component and the first windage shield. The cooling channel is coupled in flow communication with the second flow path, such that a temperature of the second flow path is less than a temperature of the first flow path due to windage effects.

In another aspect, a windage shield system is provided. The system includes a cooling channel configured to channel a flow of cooling fluid therethrough, wherein the cooling channel is at least partially bounded by a first stationary component and a second stationary component. The system also includes an annular cavity positioned within the cooling channel. The annular cavity is bounded by the second stationary component and a rotating component, and the rotating component introduces heat into the annular cavity by windage effects. The system also includes a windage shield extending between the second stationary component and the rotating component such that the heat generated by the rotating component is restricted from being transferred towards the second stationary component through the windage shield.

In yet another aspect, a windage shield system is provided. The system includes a cooling channel configured to channel a flow of cooling fluid therethrough, wherein the cooling channel is at least partially bounded by a first stationary component and a second stationary component. The system also includes an annular cavity positioned within the cooling channel. The annular cavity is bounded by a pair of stationary components and a rotating component, and the rotating component introduces heat into the annular cavity by windage effects. The system also includes a windage shield extending between the pair of stationary components such that the heat generated by the rotating component is restricted from being transferred towards the annular cavity through the windage shield.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to turbine engines, such as turbofans, and methods of manufacturing thereof. More specifically, the turbine engines described herein include one or more windage shields positioned at strategic locations within a rotor cavity of a high-pressure turbine of the turbine engine, for example. For example, one or more windage shields are positioned along a flow path of cooling fluid channeled through the rotor cavity. The windage shields are positioned relative to rotating components within the rotor cavity to restrict heat generated by the rotating components from being transferred to the cooling fluid. As such, the temperature of at least a portion of the cooling fluid channeled through the rotor cavity is reduced, thereby increasing its cooling efficiency when used to cool components downstream therefrom.

Figure 1:
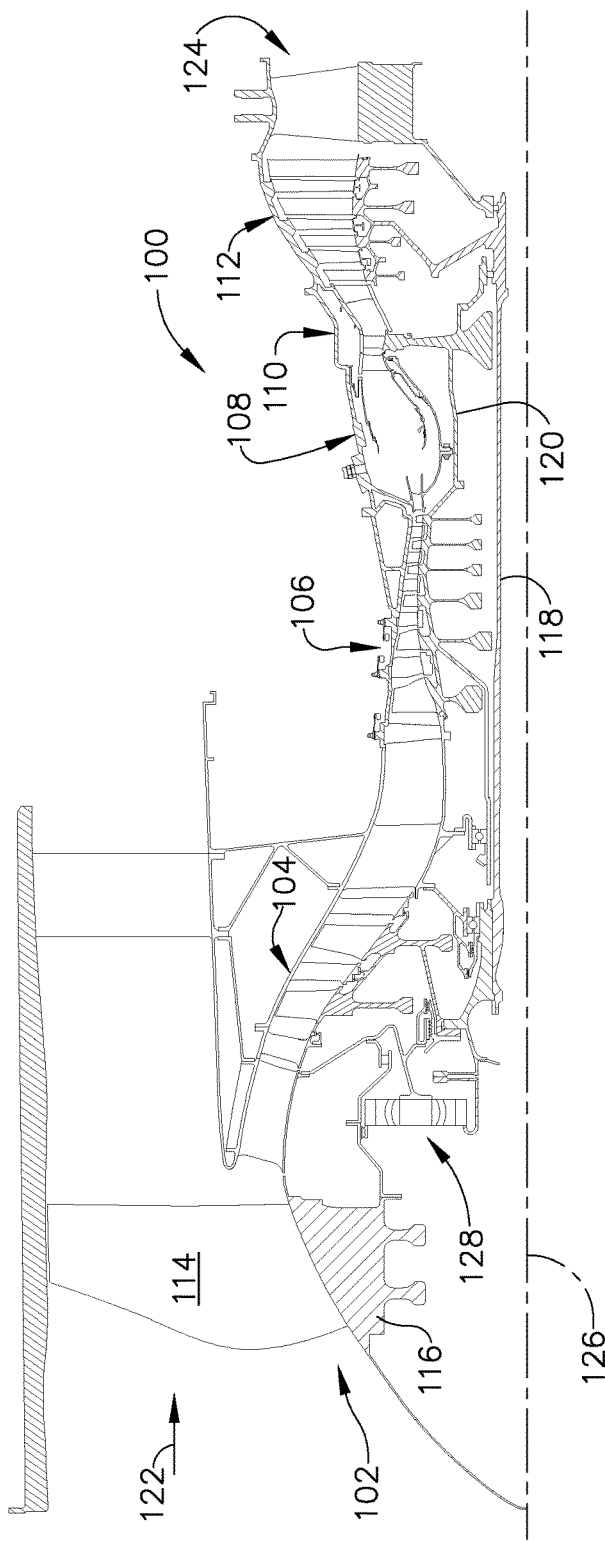
FIG. 1 is a cross-sectional schematic illustration of an exemplary turbofan engine.

FIG. 1 is a schematic illustration of an exemplary turbofan engine 100 including a fan assembly 102, a low pressure or booster compressor 104, a high-pressure compressor 106, and a combustor assembly 108. Fan assembly 102, booster compressor 104, high-pressure compressor 106, and combustor assembly 108 are coupled in flow communication. Turbofan engine 100 also includes a high-pressure turbine 110 coupled in flow communication with combustor assembly 108 and a low-pressure turbine 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbofan engine 100 has an intake 122 and an exhaust 124. Turbofan engine 100 further includes a centerline 126 about which fan assembly 102, booster compressor 104, high-pressure compressor 106, and turbine assemblies 110 and 112 rotate. Moreover, a speed-reducing gearbox 128 is coupled along first drive shaft 118 between fan assembly 102 and low-pressure turbine 112.

In operation, air entering turbofan engine 100 through intake 122 is channeled through fan assembly 102 towards booster compressor 104. Compressed air is discharged from booster compressor 104 towards high-pressure compressor 106. Highly compressed air is channeled from high-pressure compressor 106 towards combustor assembly 108, mixed with fuel, and the mixture is combusted within combustor assembly 108. High temperature combustion gas generated by combustor assembly 108 is channeled towards turbine assemblies 110 and 112. Low-pressure turbine 112 rotates at a first rotational speed, and gearbox 128 operates such that fan assembly 102 operates at a second rotational speed lower than the first rotational speed. Combustion gas is subsequently discharged from turbine engine assembly 100 via exhaust 124.

Figure 2:
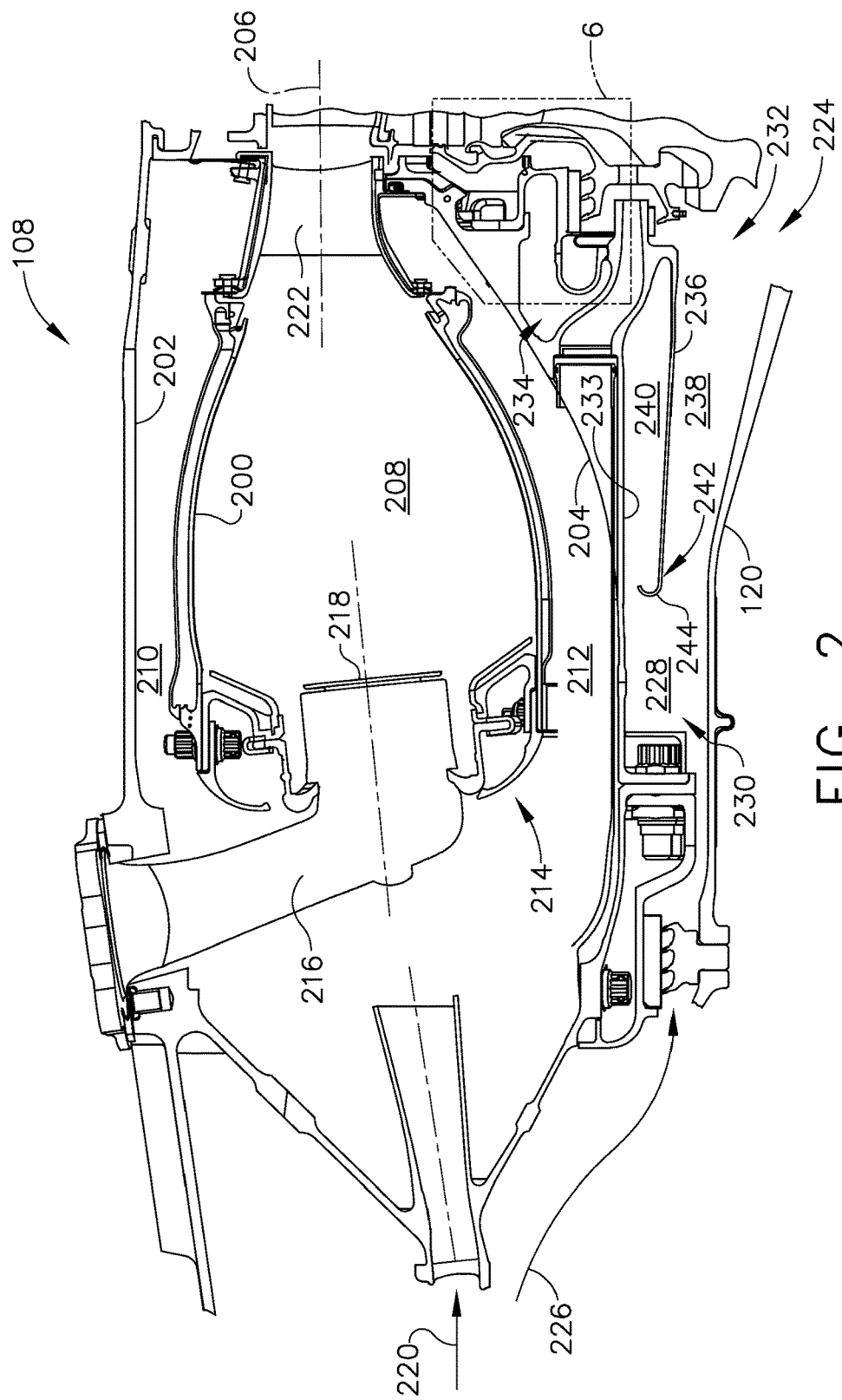
FIG. 2 is a cross-sectional illustration of an exemplary combustor assembly that may be used with the turbofan engine shown in FIG. 1.

FIG. 2 is a cross-sectional illustration of combustor assembly 108 that may be used with turbofan engine 100 (shown in FIG. 1). In the exemplary embodiment, combustor assembly 108 includes a combustor liner 200 positioned between an outer combustor casing 202 and an inner combustor casing 204. Combustor liner 200 extends circumferentially about a centerline 206 of combustor assembly 108 such that a combustion chamber 208 is defined therein. Moreover, outer and inner combustor casings 202 and 204 extend circumferentially about centerline 206 such that a radially outer passage 210 and a radially inner passage 212 are defined between combustor liner 200 and casings 202 and 204. An annular dome assembly 214 extends between, and is coupled to, combustor liner 200, and a fuel nozzle 216 extends through outer combustor casing 202 to couple to dome assembly 214. A premixer 218 receives fuel from fuel nozzle 216 and receives a first flow 220 of compressed air channeled from high-pressure compressor 106 (shown in FIG. 1). The fuel and air are swirled and mixed together by premixer 218, and the resulting fuel-air mixture is discharged into combustion chamber 208. The fuel-air mixture is combusted and channeled past an outlet nozzle 222 before being channeled towards high-pressure turbine 110 (shown in FIG. 1).

Moreover, turbofan engine 100 includes a windage shield system 224 for reducing the temperature of at least a portion of a second flow 226 of compressed air channeled from high-pressure compressor 106 (i.e., a source of cooling fluid). More specifically, windage shield system 224 includes a first annular cavity 228 having an inlet end 230 and an outlet end 232. First annular cavity 228 is coupled in flow communication with the source of cooling fluid, and directs a flow of cooling fluid (i.e., second flow 226 of compressed air) from inlet end 230 to outlet end 232. Moreover, first annular cavity 228 is at least partially bounded by a stationary component and a rotating component that introduces heat into first annular cavity 228 by windage effects. In the exemplary embodiment, the stationary component is a forward inner nozzle support 233 positioned radially outward from first annular cavity 228, and the rotating component is second drive shaft 120 positioned radially inward from first annular cavity 228. Windage shield system 224 also includes a cooling channel 234 coupled in flow communication with outlet end 232 of first annular cavity 228.

In the exemplary embodiment, a first windage shield 236 extends from outlet end 232 towards inlet end 230 within first annular cavity 228. As such, first windage shield 236 divides first annular cavity 228 into at least two flow paths, such as a first flow path 238 defined between the rotating component and first windage shield 236, and a second flow path 240 defined between the stationary component and first windage shield 236. As such, second flow 226 of compressed air is divided between first and second flow paths 238 and 240. Cooling channel 234 is coupled in flow communication with second flow path 240, such that a temperature of cooling fluid (i.e., compressed air) channeled through second flow path 240 due to windage effects is less than a temperature of cooling fluid channeled through first flow path 238 due to windage effects. More specifically, first windage shield 236 is positioned to restrict heat generated by the rotating component from increasing the temperature of cooling fluid channeled through second flow path 240.

Figure 3:
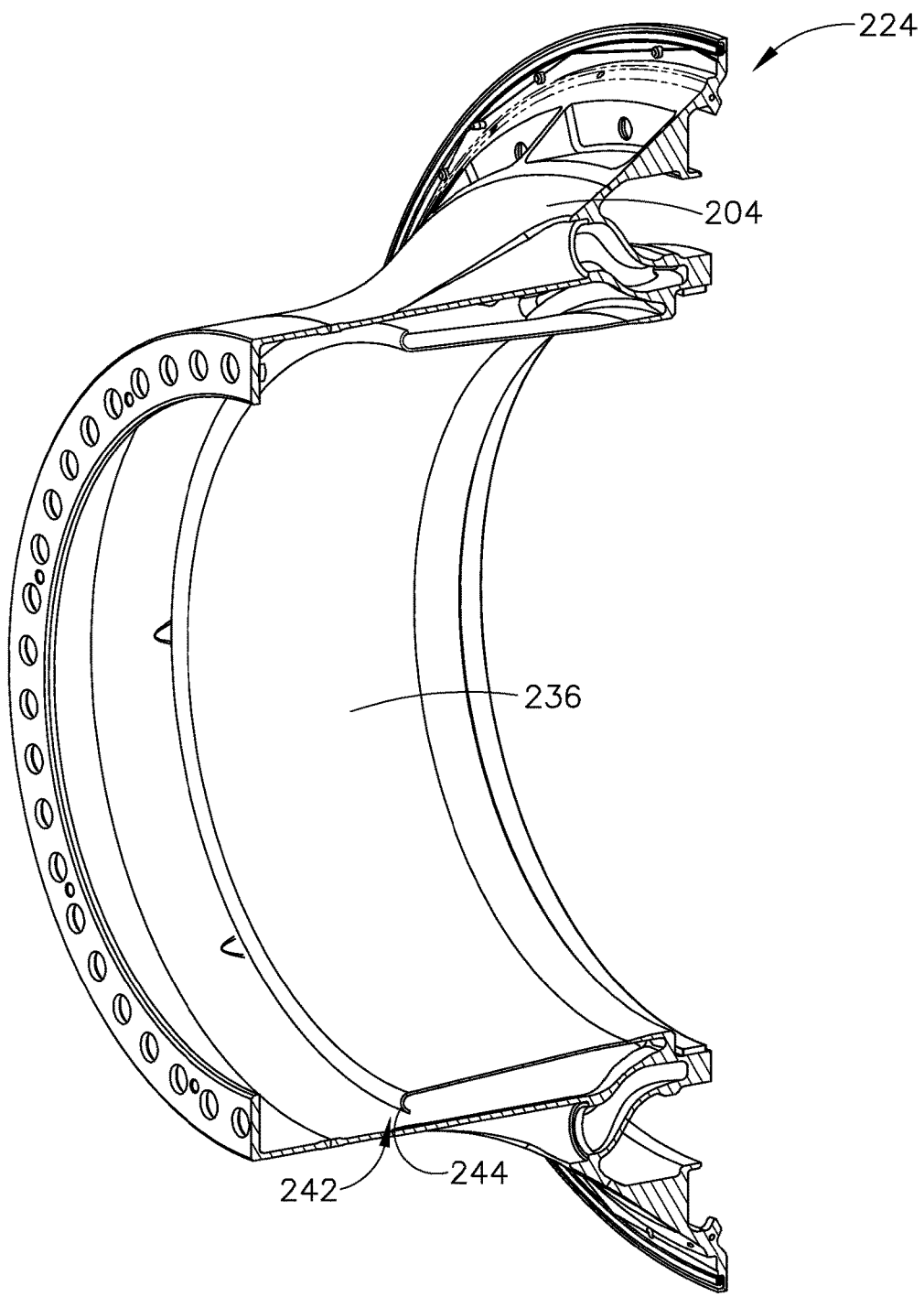
FIG. 3 is a cross-sectional perspective view of an exemplary windage shield that may be used with the combustor assembly shown in FIG. 2.

FIG. 3 is a cross-sectional perspective view of first windage shield 236 that may be used with combustor assembly 108 (shown in FIG. 2). In the exemplary embodiment, first windage shield 236 is generally cylindrically-shaped. As such, when positioned within first annular cavity 228 (shown in FIG. 2) first windage shield 236 circumscribes at least a portion of the rotating component within first annular cavity 228 to facilitate restricting heat generated by the rotating component from increasing the temperature of the cooling fluid. In an alternative embodiment, first windage shield 236 includes a plurality of windage shield segments spaced circumferentially about centerline 126.

First windage shield 236 may also include a stiffening feature extending circumferentially around a forward edge 242 of first windage shield 236. The stiffening feature facilitates reducing oscillations in first windage shield 236 caused by the cooling fluid flowing thereby. First windage shield 236 can include any stiffening feature than enables windage shield system 224 (shown in FIG. 2) to function as described herein. For example, in the exemplary embodiment, first windage shield 236 includes a bent lip portion 244 at forward edge 242. An alternative stiffening feature is described below.

Figure 4:
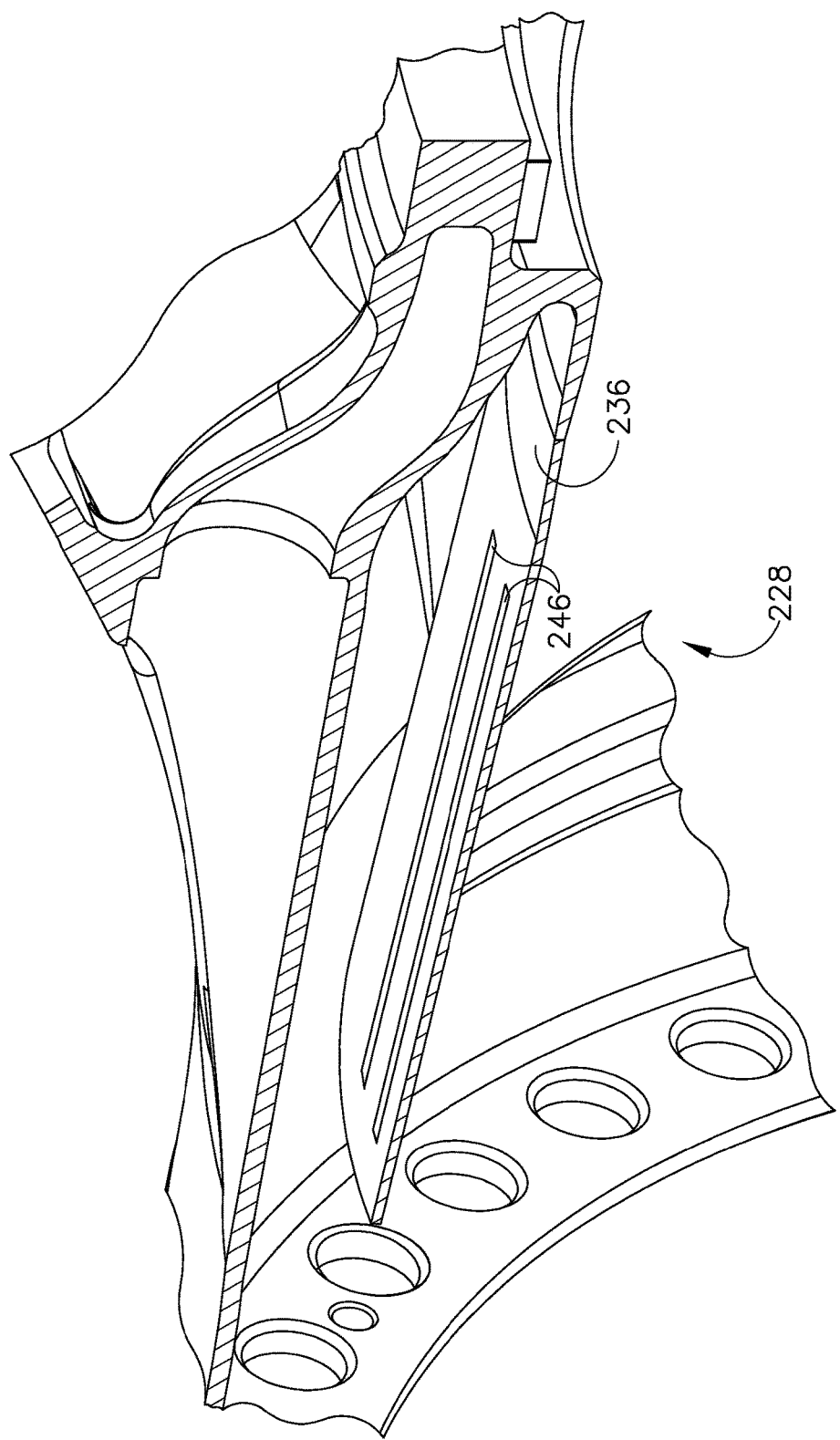
FIG. 4 is a cross-sectional perspective view of the windage shield that may be used with the combustor assembly shown in FIG. 2 having an alternative stiffening feature.

FIG. 4 is a cross-sectional perspective view of first windage shield 236 including an alternative stiffening feature. In the exemplary embodiment, first windage shield 236 includes an axially extending corrugation stiffening feature having alternating grooves or ridges 246 spaced circumferentially around first windage shield 236. Any number of grooves or ridges 246 may be defined in first windage shield 236 that facilitates reducing oscillations in first windage shield 236.

Figure 5:
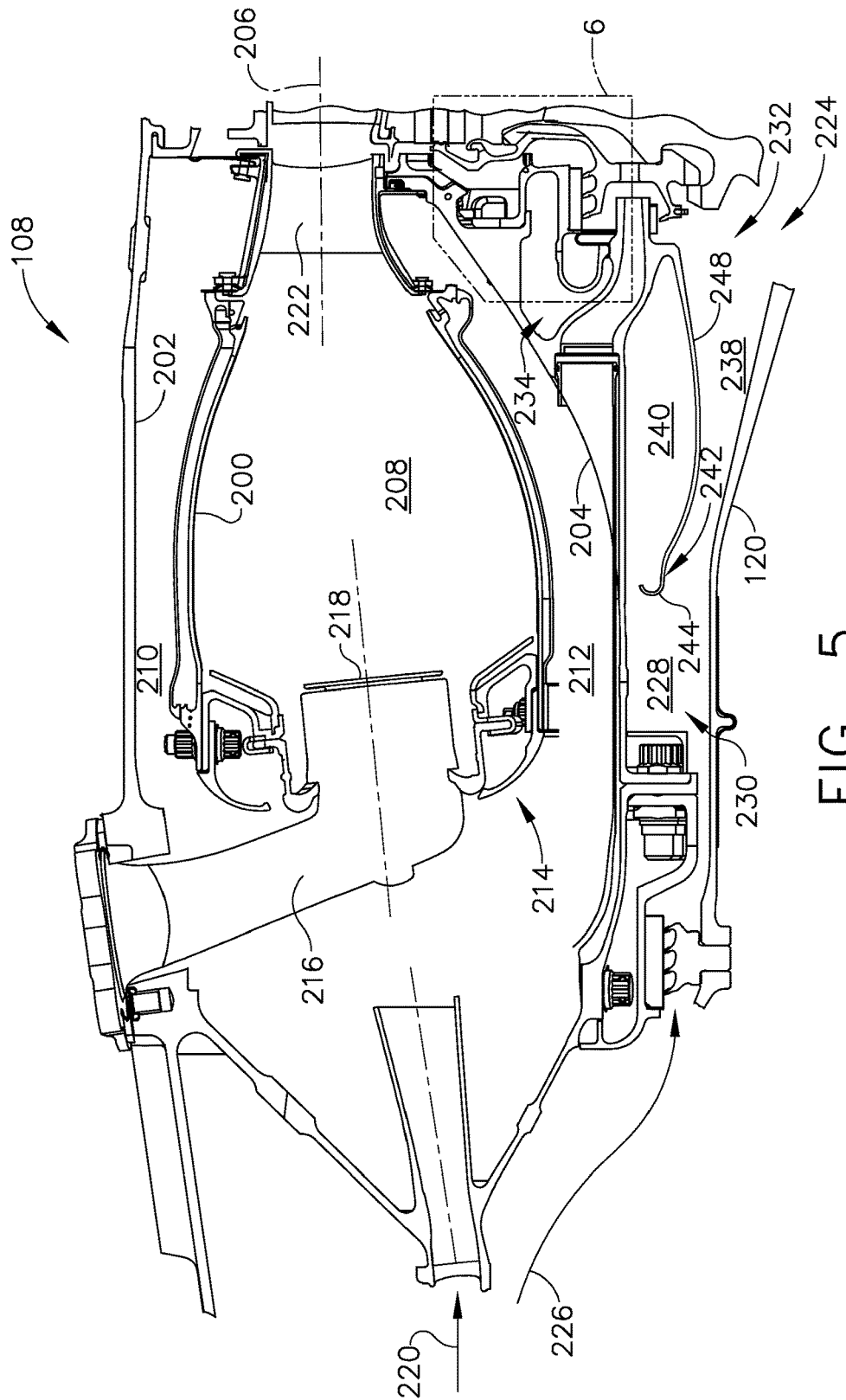
FIG. 5 is a cross-sectional illustration of the exemplary combustor assembly having an alternative windage shield.

FIG. 5 is a cross-sectional illustration of combustor assembly 108 having an alternative first windage shield 248. In the exemplary embodiment, first windage shield 248 has a bowed cross-section that shapes at least one of first flow path 238 and second flow path 240. More specifically, at least a portion of first windage shield 248 bows towards second drive shaft 120 such that the bowed portion of first windage shield 248 substantially matches the contour of second drive shaft 120. As such, the volume of second flow path 240 is increased when compared to second flow path 240 defined by first windage shield 236 (shown in FIG. 2), and thereby enables the temperature of cooling fluid therein to remain cooler than first windage shield 236. By maintaining a constant flow area between first windage shield 236 and second drive shaft 120, the axial velocity of the cooling flow remains substantially constant, thereby reducing the residence time of the cooling fluid within second flow path 240 in which windage temperate rise can occur.

Figure 6:
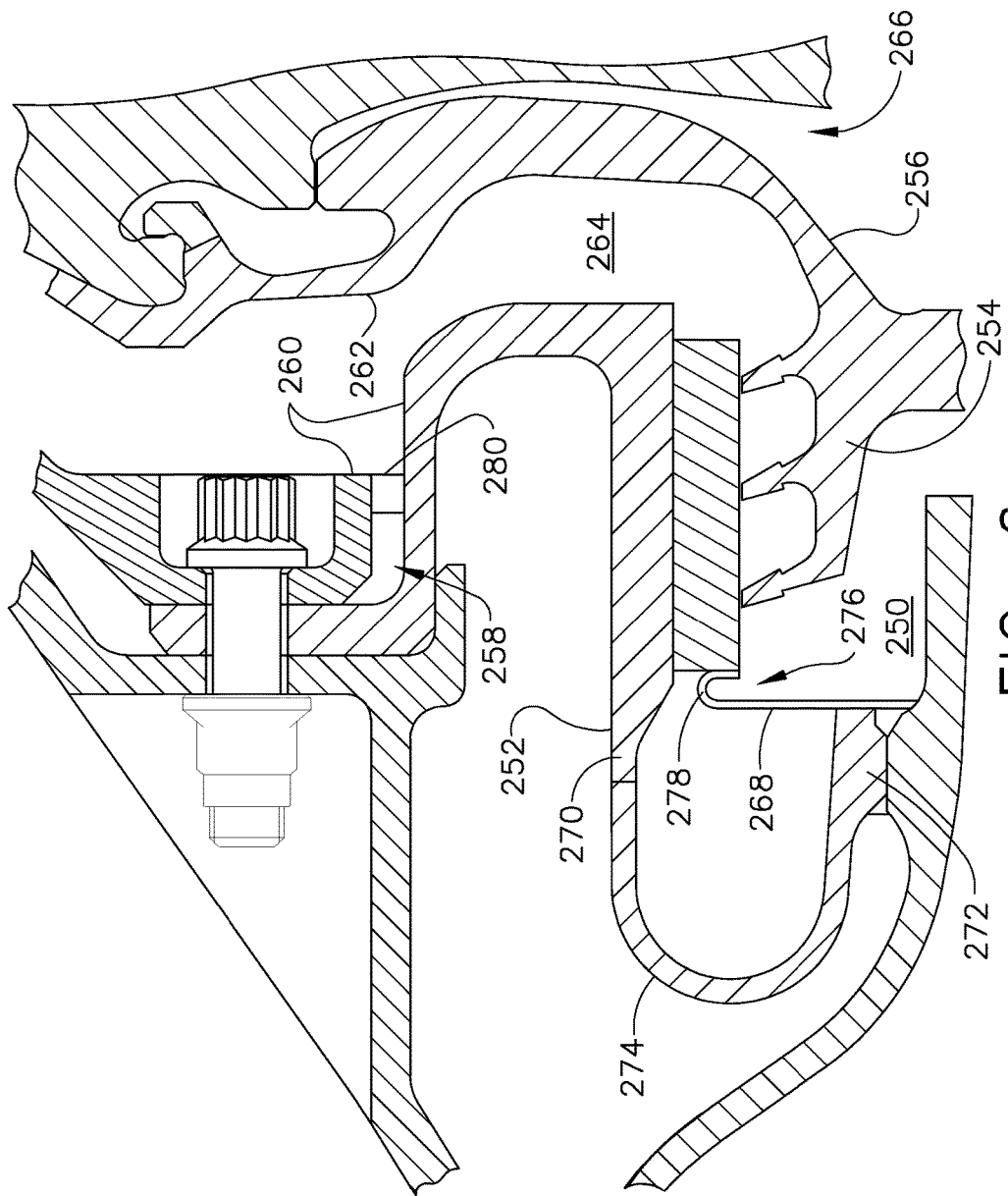
FIG. 6 is a cross-sectional illustration of a portion of the combustor assembly shown in FIG. 2 taken along Area 6.

FIG. 6 is a cross-sectional illustration of a portion of combustor assembly 108 (shown in FIG. 2) taken along Area 6. In the exemplary embodiment, combustor assembly 108 includes a second annular cavity 250 and a third annular cavity 258 positioned within cooling channel 234. Second annular cavity 250 is bounded by a second stationary component and a second rotating component. For example, the second stationary component is embodied as a forward outer seal stationary component 252, and the second rotating component is embodied as a first portion 254 of a rotor wheel 256 coupled to second drive shaft 120 (shown in FIG. 2). Third annular cavity 258 is bounded by a pair of stationary components and a third rotating component. For example, the pair of stationary components are embodied as aft inner nozzle stationary components 260, and the third rotating component is embodied as a second portion 262 of rotor wheel 256. Third annular cavity 258 is positioned within a wheelspace 264 of a turbine rotor assembly 266, and third annular cavity 258 is positioned outside a direct flow path of the flow of cooling fluid channeled through cooling channel 234.

Similar to second drive shaft 120, rotor wheel 256 introduces heat into second and third annular cavities 250 and 258 by windage effects. In the exemplary embodiment, windage shield system 224 includes a second windage shield 268 extending between the second stationary component and the second rotating component such that the heat generated by first portion 254 of rotor wheel 256 is restricted from being transferred towards the second stationary component through second windage shield 268. The second stationary component at least partially defines cooling channel 234. As such, second windage shield 268 absorbs heat generated by the second rotating component and reduces the windage volume within second annular cavity 250, such that the amount of heat transferred to cooling fluid channeled through cooling channel 234 from the second stationary component is reduced.

In the exemplary embodiment, second windage shield 268 extends substantially radially between a first portion 270 and a second portion 272 of the second stationary component. More specifically, second windage shield 268 is positioned between the second rotating component and a bent portion 274 of the second stationary component. Bent portion 274 extends between first and second portions 270 and 272 of the second stationary component.

Second windage shield 268 also includes a stiffening feature positioned at a free end 276 of second windage shield 268. The stiffening feature facilitates reducing oscillations in second windage shield 268 caused by fluid flowing thereby. Second windage shield 268 can include any stiffening feature than enables windage shield system 224 to function as described herein. For example, in the exemplary embodiment, second windage shield 268 includes a bent lip portion 278 at free end 276.

In some embodiments, windage shield system 224 also includes a third windage shield 280 extending between the pair of stationary components that bound third annular cavity 258. As such, the heat generated by second portion 262 of rotor wheel 256 is restricted from being transferred towards third annular cavity 258 through third windage shield 280. Third windage shield 280 is formed integrally with at least one stationary component of the pair of stationary components, and extends substantially radially between the pair of stationary components. As such, third windage shield 280 facilitates restricting cooling fluid channeled through cooling channel 234 from windage temperature increases in an otherwise open cavity.

An exemplary technical effect of the methods, systems, and apparatus described herein includes at least one of: (a) reducing the temperature of cooling fluid channeled through a rotor cavity; and (b) increasing the cooling efficiency of cooling fluid channeled through a rotor cavity.

Exemplary embodiments of windage shields are described above in detail. The windage shields are not limited to the specific embodiments described herein, but rather, components of systems and/or steps of the methods may be utilized independently and separately from other components and/or steps described herein. For example, the windage shields may also be used in combination with other systems that would benefit from limiting heat transferred to cooling fluid due to windage effects, and are not limited to practice with only the systems and methods as described herein. Rather, the exemplary embodiment can be implemented and utilized in connection with many other machinery applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A windage shield system comprising:
an annular cavity having an inlet end and an outlet end, said annular cavity configured to direct a flow of cooling fluid from said inlet end to said outlet end;
a source of a flow of cooling fluid coupled in flow communication with said annular cavity, said annular cavity bounded by a stationary component and a rotating component, said rotating component introducing heat into said annular cavity by windage effects;
a cooling channel coupled in flow communication with said outlet end;
a first windage shield extending from said outlet end towards said inlet end within said annular cavity, said first windage shield dividing said annular cavity into at least two flow paths, a first flow path defined between said rotating component and said first windage shield, a second flow path defined between said stationary component and said first windage shield, said cooling channel in flow communication with said second flow path such that a temperature of the second flow path is less than a temperature of the first flow path due to windage effects; and
a second annular cavity positioned within said cooling channel, said second annular cavity bounded by a second stationary component and a second rotating component, said second rotating component introducing heat into said second annular cavity by windage effects; and
a second windage shield extending between said second stationary component and said second rotating component such that the heat generated by said second rotating component is restricted from being transferred towards said second stationary component through said second windage shield.

2. The system of claim 1, wherein said stationary component is radially outward from said annular cavity.

3. The system of claim 1, wherein said rotating component is radially inward from said annular cavity.

4. The system of claim 1, wherein said first windage shield is cylindrically-shaped.

5. The system of claim 1, wherein said first windage shield circumscribes at least a portion of a gas turbine engine rotor.

6. The system of claim 1, wherein said first windage shield comprises a stiffening feature extending circumferentially around a forward edge of said first windage shield.

7. The system of claim 1, wherein said first windage shield comprises an axially extending corrugation stiffening feature having alternating grooves and ridges spaced circumferentially around said first windage shield.

8. The system of claim 1, wherein said first windage shield comprises a bowed cross-section configured to shape at least one of said first flow path and said second flow path.

9. A windage shield system comprising:
an annular cavity having an inlet end and an outlet end, said annular cavity configured to direct a flow of cooling fluid from said inlet end to said outlet end;
a source of a flow of cooling fluid coupled in flow communication with said annular cavity, said annular cavity bounded by a stationary component and a rotating component, said rotating component introducing heat into said annular cavity by windage effects;
a cooling channel coupled in flow communication with said outlet end;
a first windage shield extending from said outlet end towards said inlet end within said annular cavity, said first windage shield dividing said annular cavity into at least two flow paths, a first flow path defined between said rotating component and said first windage shield, a second flow path defined between said stationary component and said first windage shield, said cooling channel in flow communication with said second flow path such that a temperature of the second flow path is less than a temperature of the first flow path due to windage effects; and
a third annular cavity positioned within said cooling channel, said third annular cavity bounded by a pair of stationary components and a third rotating component, said third rotating component introducing heat into said third annular cavity by windage effects; and
a third windage shield extending between said pair of stationary components such that the heat generated by said rotating component is restricted from being transferred towards said third annular cavity through said third windage shield.

10. A windage shield system comprising:
a cooling channel configured to channel a flow of cooling fluid therethrough, wherein said cooling channel is at least partially bounded by a first stationary component and a second stationary component;
an annular cavity positioned within said cooling channel, said annular cavity bounded by said second stationary component and a rotating component, said rotating component introducing heat into said annular cavity by windage effects;
a first windage shield extending between said second stationary component and said rotating component such that the heat generated by said rotating component is restricted from being transferred towards said second stationary component through said second windage shield; and
wherein said first windage shield extends substantially radially between a first portion and a second portion of said second stationary component.

11. The system of claim 10, wherein said first windage shield is positioned between said rotating component and a bent portion of said second stationary component extending between a first portion and a second portion of said second stationary component.

12. The system of claim 10, wherein said first windage shield comprises a stiffening feature positioned at a free end of said first windage shield.

13. A windage shield system comprising:
a cooling channel configured to channel a flow of cooling fluid therethrough, wherein said cooling channel is at least partially bounded by a first stationary component and a second stationary component;

an annular cavity positioned within said cooling channel, said annular cavity bounded by said second stationary component and a rotating component, said rotating component introducing heat into said annular cavity by windage effects;

a first windage shield extending between said second stationary component and said rotating component such that the heat generated by said rotating component is restricted from being transferred towards said second stationary component through said second windage shield;

a second annular cavity positioned within said cooling channel, said second annular cavity bounded by a pair of stationary components and a third rotating component, said third rotating component introducing heat into said second annular cavity by windage effects; and a second windage shield extending between said pair of stationary components such that the heat generated by said third rotating component is restricted from being transferred towards said second annular cavity through said second windage shield.

14. A windage shield system comprising:

a cooling channel configured to channel a flow of cooling fluid therethrough, wherein said cooling channel is at least partially bounded by a first stationary component and a second stationary component;

an annular cavity positioned within said cooling channel, said annular cavity bounded by a pair of stationary components and a rotating component, said rotating component introducing heat into said annular cavity by windage effects; and a first windage shield extending between said pair of stationary components such that the heat generated by said rotating component is restricted from being transferred towards said annular cavity through a third windage shield.

15. The system of claim 14, wherein said first windage shield is integrally formed with at least one stationary component of said pair of stationary components.

16. The system of claim 14, wherein said first windage shield extends substantially radially between said pair of stationary components.

17. The system of claim 14, wherein said annular cavity is positioned within a wheelspace of a turbine rotor assembly.

18. The system of claim 14, wherein said annular cavity is positioned outside a direct flow path of the flow of cooling fluid channeled through said cooling channel.

* * * * *